United States Patent
Salomon

(10) Patent No.: US 6,907,132 B1
(45) Date of Patent: Jun. 14, 2005

(54) METHOD AND SYSTEM FOR PRODUCING ROBUST INDICIA FOR DIGITAL PRINTING AND VERIFICATION

(75) Inventor: James A. Salomon, Cheshire, CT (US)

(73) Assignee: Pitney Bowes Inc., Stamford, CT (US)

( * ) Notice: Subject to any disclaimer, the term of this patent is extended or adjusted under 35 U.S.C. 154(b) by 611 days.

(21) Appl. No.: 09/689,017

(22) Filed: Oct. 12, 2000

(51) Int. Cl.[7] .............................................. G06K 9/00
(52) U.S. Cl. ....................... 382/101; 382/175; 209/584; 705/62
(58) Field of Search ................................. 382/100, 101, 382/102, 108, 112, 113, 137, 139, 140, 143, 161, 169, 175, 182, 186, 189, 231, 260, 275, 290, 314, 321, 310, 141; 209/583, 584, 582, 585, 586; 705/62, 401, 50, 71, 80, 402, 404, 405, 406; 101/91, 371; 358/1.5, 505; 700/231; 235/495; 345/778, 23; 348/206; 347/248

(56) References Cited

U.S. PATENT DOCUMENTS

| 4,725,718 A | * | 2/1988 | Sansone et al. ............. 235/495 |
| 4,775,246 A | * | 10/1988 | Edelmann et al. ............ 705/62 |
| 4,873,645 A | * | 10/1989 | Hunter et al. ................ 700/231 |
| 5,154,118 A | * | 10/1992 | Doery et al. .................. 101/91 |
| 5,427,025 A | * | 6/1995 | Lee et al. .................... 101/371 |
| 5,765,475 A | * | 6/1998 | Salomon ....................... 101/91 |
| 5,862,243 A | * | 1/1999 | Baker et al. ................ 382/101 |
| 5,900,901 A | * | 5/1999 | Costanza et al. ........... 347/248 |
| 5,917,925 A | * | 6/1999 | Moore ........................ 382/101 |

* cited by examiner

Primary Examiner—Bhavesh M. Mehta
Assistant Examiner—Seyed Azarian
(74) Attorney, Agent, or Firm—Ronald Reichman; Angelo N. Chaclas

(57) ABSTRACT

A method and system for improving the capture of an OCR character region of a postage indicium, wherein the OCR character region may exhibit a defect associated with the production or the reading of the indicium. A plurality of error compensation marks is provided in the proximity of the OCR character region such that the error compensation marks are caused to exhibit one or more changes indicative of the defect of the OCR character region. Thus, the defect in the OCR character region can be identified by detecting the changes in the error compensation marks. Accordingly, the defect in the OCR character region can be compensated for when the OCR characters are interpreted.

13 Claims, 4 Drawing Sheets

METHOD AND SYSTEM FOR PRODUCING ROBUST INDICIA FOR DIGITAL PRINTING AND VERIFICATION

TECHNICAL FIELD

The present invention relates generally to a digital meter and, more specifically, to the affixing of a postage indicia on a mailpiece.

BACKGROUND OF THE INVENTION

Currently, one can mail a letter or a package through the U.S. Postal Service (hereafter referred to as USPS) using a postage indicium. In using a postage indicium, the sender usually uses a postage meter certified by the USPS (or the government postal service for other countries) to issue a postage indicium according to the weight of the mailpiece, the destination, and the chosen service. The meter will print on the indicium the paid postage amount, the indicium issuance date, location, the meter number, and a postal service symbol. The indicium also carries encryption information, which includes the postage amount and other postal data that relate to the mailpiece and the postage meter that prints the indicium. The encrypted information, which is in usually referred to as a digital token or a digital signature, is used for authentication purposes. The encryption is also used to protect the integrity of information, including the postage amount, imprinted on the mailpiece for later verification of postage payment. Since the digital token incorporates encrypted information relating to evidencing of postage payment, altering the printed information in an indicium is detectable by standard verification procedures. Examples of systems that are capable of generating and printing such indicia are described in U.S. Pat. Nos. 4,725,718, 4,757,537, 4,775,246 and 4,873,645, each assigned to the assignee of the present invention.

It is preferable to include in the indicium a plurality of alphanumerical characters, which can be read by an Optical Character Recognition (OCR) device and by an operator. The use of such OCR characters on an indicium has the combined advantage of human readability and machine readability. Currently, postage indicia and OCR characters can be printed by the sender using an inkjet printer, a thermal transfer print head or another personal printer. The print head of an inkjet printer typically has one or more rows of nozzles to simultaneously push out a plurality of ink droplets to form a corresponding number of rows of pixels. Under normal circumstances, when the velocity of the mailpiece relative to the print head is constant, the print head can produce row after row of pixels on the mailpiece in a rectangular matrix formation, with each row being substantially perpendicular to the traveling direction of the mailpiece, and the pitch between pixel rows also being constant. If the velocity of the mailpiece is not constant, the pitch between the pixel rows may vary. Under unusual circumstances, the pixel rows may be caused to become skewed in one direction or another. Consequently, the image produced by the printer may become distorted. For example, a vertical line may become angled, and a rectangle may be printed as a non-orthogonal quadrilateral.

An OCR reader usually uses a linear optical scanning device to scan in the printed image. An OCR engine uses some sort of-pattern matching algorithm to interpret the scanned-in image. If the OCR character region in an indicium is distorted when it is printed or when it is captured by the OCR reader, there is a possibility that the characters in that region may not be interpreted correctly. It is, therefore, desirable and advantageous to provide a method for improving the capture of an OCR character and/or other symbology region in an indicium on a mailpiece, so that the distortion in the OCR character and/or other symbology region can be detected to ensure that the symbols or OCR characters, as scanned in by optical scanner, are interpreted correctly.

SUMMARY OF THE INVENTION

It is the primary objective of the present invention to reduce the errors in interpreting OCR characters in an OCR character and/or other symbology region of a postage indicium applied on a mailpiece, wherein the symbology or OCR character region may be caused to exhibit a defect associated with the production of the postage indicium or with the reading of the postage indicium. Accordingly, the first aspect of the present invention is to provide a method for improving the capture of the symbology or OCR character region. The method includes the steps of providing one or more error compensation marks in the proximity of the symbology or OCR character region such that the error compensation marks are caused to exhibit changes indicative of the defect of the symbology or OCR character region and detecting the changes in the error compensation marks in order to compensate for the defect of the symbology or OCR character region.

Preferably, the error compensation marks include a plurality of timing marks in order to identify the defect of the symbology or OCR character region caused by irregularities in the transport of the mailpiece through the indicium printing device, relative to the timing signal used by the printing device.

When a postage indicium is printed with a print head, it is preferable that the error compensation marks include a plurality of graphical images in order to identify the defect of the symbology or OCR character region caused by irregularities in the print head. These irregularities include misdirected jets, loss of jets, and so forth.

The second aspect of the present invention is to provide a system for improving the capture of a symbology or OCR character region in a postage indicium on a mailpiece, wherein the symbology or OCR character region includes symbols or OCR characters which may be caused to exhibit a defect associated with the production of the postage indicium or the reading of the postage indicium. The system includes:

a first mechanism, responsive to the mailpiece, for generating and providing one or more error compensation marks in the proximity of the symbology or OCR region, wherein the error compensation marks can be caused to exhibit changes indicative of the defect in the symbology or OCR region;

a second mechanism for reading the error compensation marks and producing data indicative of the error compensation marks;

a third mechanism, responsive to the data, for detecting the changes in the error compensation marks and for providing a signal indicative of the changes; and a fourth mechanism, responsive to the signal, for compensating for the defect in the symbology, according to the detected changes in the error compensation marks.

Preferably, the second mechanism includes an optical scanner, and the data includes a scanned image.

Preferably, the fourth mechanism includes an OCR reader, operatively connected to the optical scanner, for recognizing the OCR characters.

Preferably, the OCR reader is also operatively connected to the third mechanism for compensating for the defect in the OCR characters, according to the detected changes in the error compensation marks.

Preferably, a fixed set of graphical information is used to compare with a scanned image so that errors due to printing and scanning can be corrected in an image processing algorithm. The additional graphical data is relatively small compared to the data content. The additional graphical data can be incorporated into indicia artwork, such as the borders and logos used in typical metering systems. Thus, the additional data does not incur large penalties in ink usage or print head life. The image processing algorithm for error correction is configured to process images in parallel to standard OCR read algorithms. If needed, the processed image can be substituted for parts of the image which are otherwise not readable.

The present invention will become apparent upon reading the description taken in conjunction with FIGS. 1 to 5.

DETAILED DESCRIPTION

Figure 1:
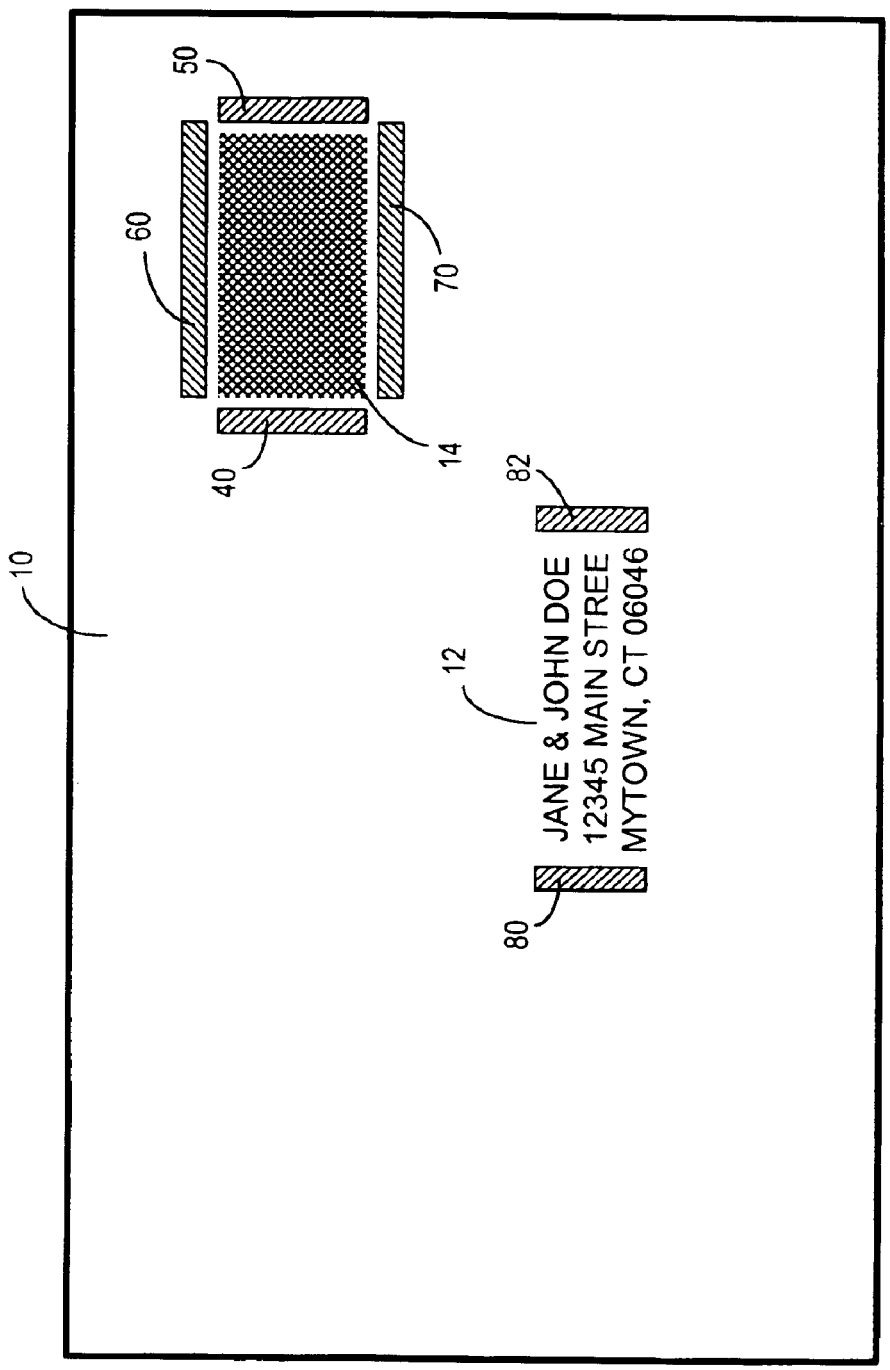
FIG. 1 is a diagrammatic representation illustrating a mailpiece having printed thereon an indicium, a destination address and a plurality of error compensation marks.

FIG. 1 illustrates a mailpiece 10 having a destination address 12 and an indicium 14 printed thereon. It should be noted that the indicium 14 shown in FIG. 1 includes an OCR character region 16 (see FIG. 2). The OCR character region 16 advantageously provides alphanumerical characters which can be read by an OCR reader. However, if the OCR characters are distorted or damaged when they are produced or when they are read in by an OCR reader, they may be interpreted incorrectly by the OCR reader. Thus, it is preferable to place a plurality of error compensation marks 40, 50, 60 and 70 in the proximity of the OCR character region 16 to detect the defects on the indicium 14, especially in the OCR character region 16. Furthermore, it is also possible to provide additional error compensation marks 80 and 82 in the proximity of the destination address 12 to help ensure that the destination address 12 is read correctly by a device.

Figure 2:
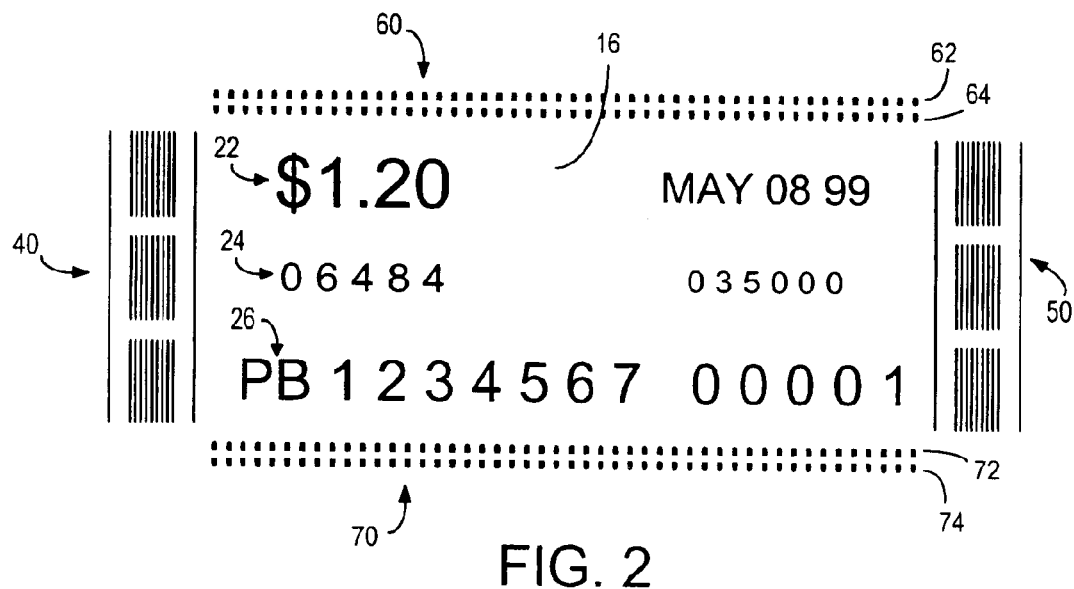
FIG. 2 is a diagrammatic representation illustrating an OCR character region and the error compensation marks in the proximity of the OCR character region.
Figure 3:
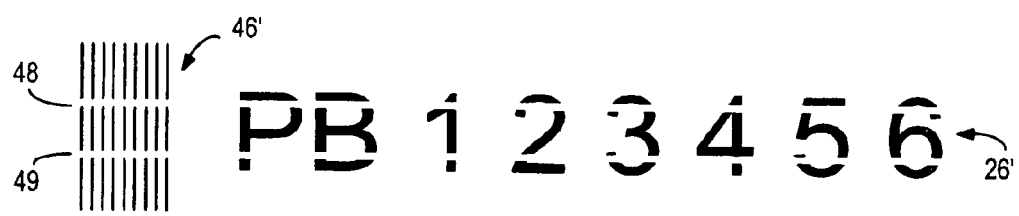
FIG. 3 is a diagrammatic representation illustrating a defect on part of the OCR character region.

As shown in FIG. 2, the error compensation marks 40 and 50 include a plurality of graphic elements especially designed to detect the defects caused by the inkjet nozzles of an inkjet printer print-head (not shown). In particular, the error compensation mark 40 includes a group of ladder images 42, 44 and 46 to be associated, respectively, with the character rows 22, 24 and 26 in the OCR character region 16. Additionally, the error compensation mark 60 includes two rows of timing marks 62 and 64, while the error compensation mark 70 includes two rows of timing marks 72 and 74. The timing marks are designed to detect the defects caused mainly by the irregularities in the transport of the mailpiece through the inkjet printer. It should be noted that the characters within the OCR character region 16 in an indicium 14 may vary from one mailpiece to another, and there are many different types of defects or distortions that may appear on an OCR character. Thus, it is difficult to design an algorithm to detect the differences between a character in its normal form and the same character in one of the many distorted forms. For example, each of the OCR characters in the character row 26' contains some defects, as shown in FIG. 3. While the defective characters may be easily recognizable by an operator, they may be interpreted incorrectly by a machine. In contrast, error compensation marks can be made of fixed patterns printed at fixed locations so that any changes in the patterns can be easily detected. For example, one could simply store the fixed patterns in a database, and use these stored patterns as templates for comparison with the scanned-in patterns. As shown in FIG. 3, the ladder image 46' has two blank strips 48 and 49. When the ladder image 46' and a normal ladder image 46 are compared, it can be recognized that the problem is missing ink droplets, probably caused by a blockage in the inkjet nozzles. Accordingly, the defective characters in the character row 26' can be recognized by an error detection and correction algorithm (see FIG. 5).

Figure 4B:
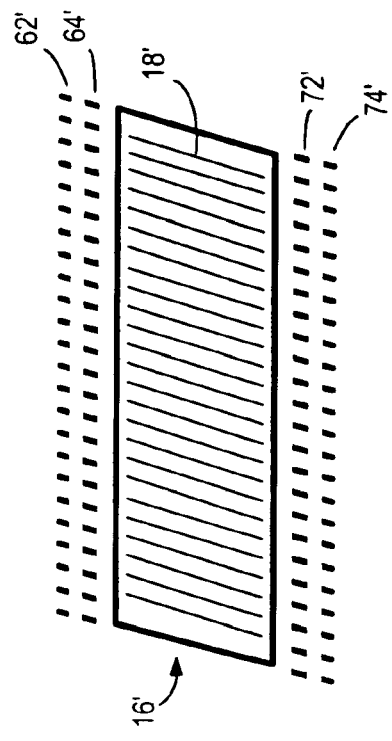
FIGS. 4b–4d are diagrammatic representations illustrating different defects on part of the OCR character region and the nearby timing marks.
Figure 4D:
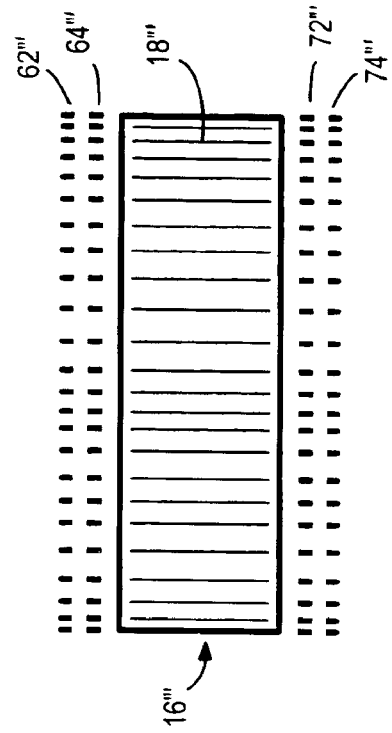
Figure 4A:
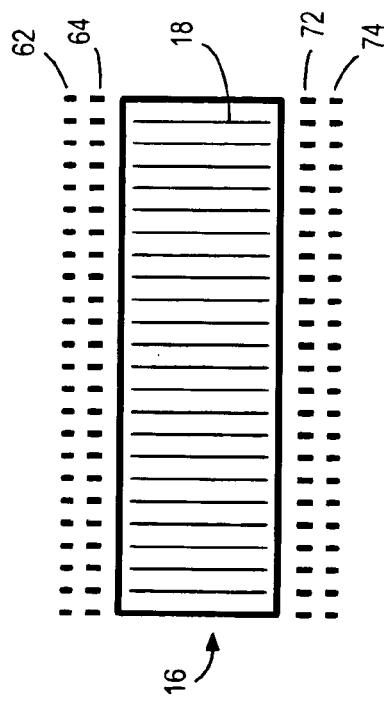
FIG. 4a is a diagrammatic representation illustrating a plurality of timing marks near an OCR character region.

Defects in the OCR character regions due to irregularities in the mailpiece transport through a printer and other similar causes can be identified by the use of timing marks. FIGS. 4a4b illustrate some of the defects that are identifiable by timing marks. For illustrative purposes, FIG. 4a shows an OCR character region 16 under normal printing conditions, which is substantially rectangular in shape with a plurality of evenly spaced vertical lines 18. As shown, two rows of timing marks 62 and 64 are provided above the OCR character region 16 and two rows of timing marks 72 and 74 are provided below the OCR character region 16. Under normal printing conditions, the timing marks in each row are evenly spaced, as shown in FIG. 4a. Also, all the corresponding timing marks in rows 62, 64, 72 and 74 are substantially aligned with each other in the vertical direction.

If the nozzle rows in an inkjet printer are not perpendicular to the transport direction of the mailpiece, either by design or transport misalignment, a skewed image may result. As shown in FIG. 4b, a normally rectangular OCR character region would look like a parallelogram, as denoted by numeral 16'. Accordingly, the lines within the OCR character region 16' may become slanted, as denoted by numeral 18'. Thus, the printer problem that distorts the OCR character region 16' also causes the timing marks to appear differently. As shown in FIG. 4b, the corresponding timing marks in rows 62, 64, 72 and 74 are no longer aligned vertically, as denoted by numerals 62', 64', 72' and 74'. This misalignment can be detected by using an optical scanner having a linear row of optical sensors to scan in the timing marks, wherein the orientation of the optical sensor row is perpendicular to the transport direction of the mailpiece when the timing marks are read.

Figure 4C:
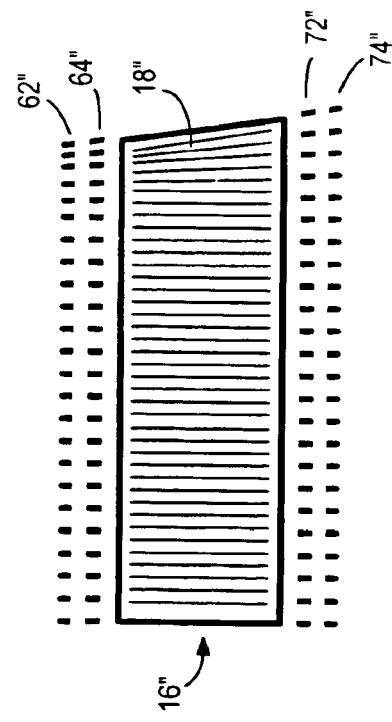

If the plane surface of a mailpiece is not even, such as when a corner of the mailpiece is curved upward, the OCR character region may be distorted in a different way. As shown in FIG. 4c, one of the upper corners of the OCR character region may appear squeezed inward. While most of the vertical lines 18' in the OCR character region 16" appear to be normal, a few right-most lines are tilted to the left. This type of distortion would also appear on the timing marks 62", 64", 72" and 74'.

If the mailpiece transport mechanism in the printer behaves erratically such that the transport velocity of the mailpiece relative to the inkjet printing speed is non-uniform, this will cause yet another different type of defect in the OCR character region. As shown in FIG. 4d, while the entire OCR character region 16''' appears to be normal as it retains a rectangular shape, the vertical lines 18''' within the OCR character region 16''' are no longer evenly spaced. This type of defect in the OCR character region 16''' also appears in the timing marks 62''', 64''', 72''' and 74'''.

FIGS. 2 through 4d demonstrate that it is possible to provide a plurality of error compensation marks in the proximity of an OCR character region for distortion detection. These error compensation marks are caused to exhibit changes indicative of the defect of the OCR character region. Once the changes in the error compensation marks are detected, the defect of the OCR character region can be compensated for.

It should be noted that the method, according to the present invention, is used to detect the defect in the OCR character region, but it is not intended to correct the defect on the mailpiece itself. The defect is compensated for only in the interpretation of the scanned-in image by an OCR reader. Thus, the first aspect of the present invention is to detect the defect in the OCR character region of a postage indicium and to help ensure that the OCR characters are interpreted correctly.

Figure 5:
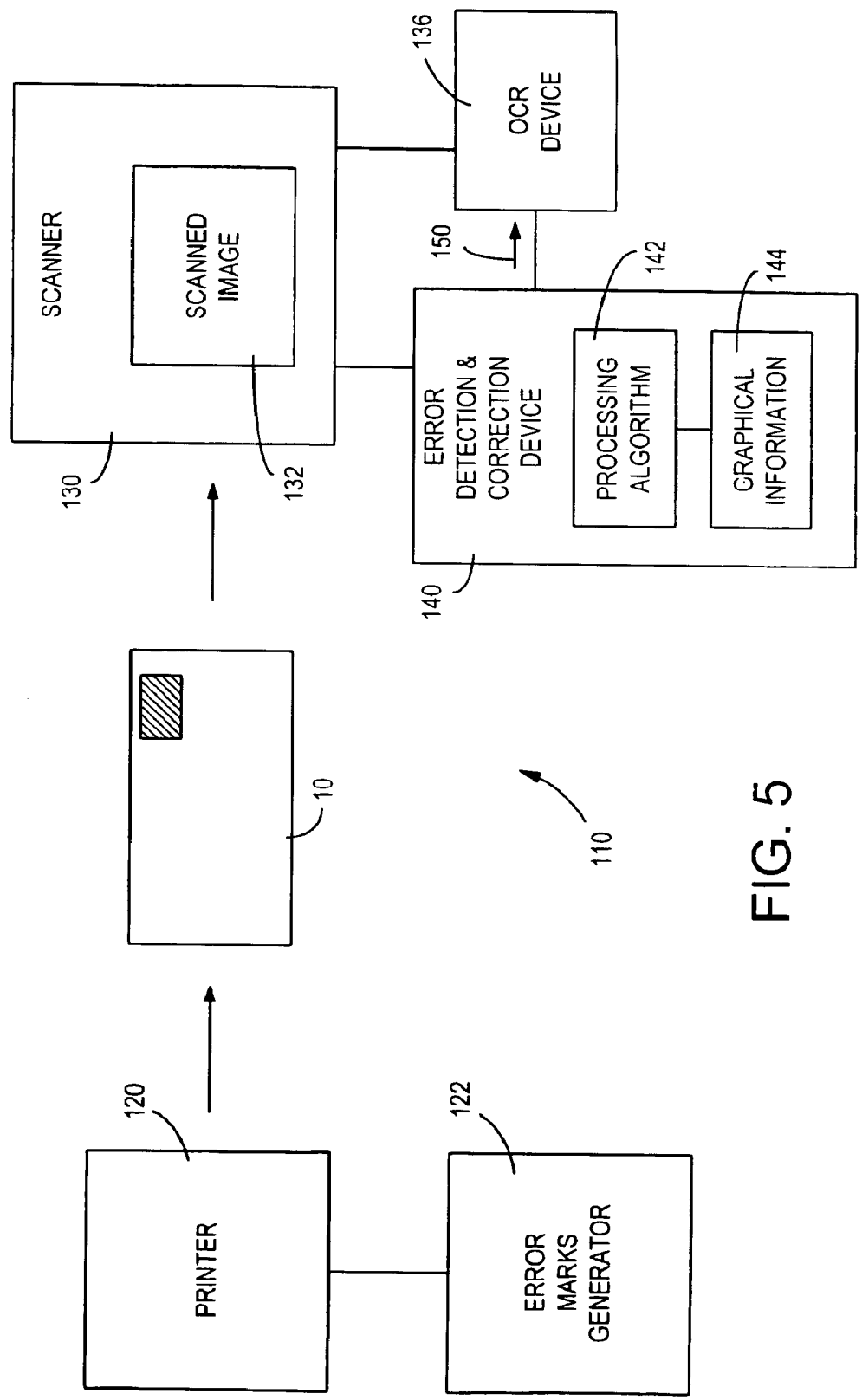
FIG. 5 is a diagrammatic representation illustrating a system for identifying the defect in an OCR character region and for compensating for the defect.

The second aspect of the present invention is to provide a system 110 for improving the capture of an OCR region 16 in a postage indicium 14 on a mailpiece 10 (see FIG. 1), wherein the OCR character region 16 includes a plurality of OCR characters which may exhibit defects associated with the production of the postage indicium or the reading of the postage indicium. As shown in FIG. 5, the system 110 includes a printer 120, which is operatively connected to a mechanism 122 capable of causing the printer 120 to print a plurality of error compensation marks 40, 50, 60, 70, 80 and 82 in the proximity of the OCR character region 16 on the mailpiece 10. The error compensation marks 40, 50, 60, and 70 can be caused to exhibit changes indicative of the defects in the OCR character region 16. Optionally, error compensation marks 80 and 82 are provided in the proximity of the destination address 12 on the mailpiece 10 (FIG. 1). Likewise, the error compensation marks 80 and 82 can be caused to exhibit changes indicative of the defects in the destination address 12. The system 110 further comprises an optical scanner 130 to scan in the OCR characters in the OCR character or other symbology region 14 (and optionally the destination address 12) along with the error compensation marks 40, 50, 60, 70, 80 and 82. The scanned image obtained by the optical scanner 130 is denoted by reference numeral 132. The optical scanner 130 is operatively connected to an OCR device 136, which recognizes the OCR characters based on the scanned image 132. The optical scanner is further connected to a mechanism 140 for detecting the changes in the error compensation marks, based on the scanned image 132, in order to compensate for the defect of the OCR characters and other symbology in the scanned symbology region 14, according to the detected changes in the error compensation marks. Preferably, the mechanism 140 uses an image processing algorithm 142 to compare the scanned image 132 with a fixed set of graphical information 144 in order to the detect the changes in the error compensation marks 40, 50, 60, 70, 80 and 82. Furthermore, the mechanism 140 provides a signal 150 to the OCR device 136 so as to allow the OCR device 136 to recognize OCR characters which may be distorted or affected by the defects. For example, the mechanism 140 may provide a signal indicating the missing inkjets as shown in FIG. 3.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for improving capture of a Symbology region in a postage indicium applied on a mailpiece, wherein the symbology region may be caused to exhibit a defect associated with the production and/or scanning of the postage indicium, said method comprising the steps of:
   (a) providing one or more error compensation marks in the proximity of the symbology region which includes an OCR character region such that the error compensation marks are caused to exhibit changes indicative of the defect of the symbology region wherein the error compensation marks include a plurality of timing marks for identifying the defect of the OCR character region caused by irregularities in transport of the mailpiece through the indicium printing device, and
   (b) detecting the changes in the error compensation marks in order to compensate for the defect of the symbology region to ensure that the Symbology region is being interpreted correctly.

2. The method of claim 1, wherein the irregularities are the result of a mismatch between transport velocity for transporting the mailpiece and timing signals of the printing device.

3. The method of claim 1, wherein the print device includes a print head having a plurality of inkjet nozzles, and wherein the irregularities are the result of a misalignment of the transport mechanism with the print head, causing the inkjet nozzles to appear skewed relative to a transport direction of the transport mechanism.

4. The method of claim 1, wherein the irregularities are the result of an uneven surface section of the mailpiece.

5. The method of claim 1, wherein the error compensation marks include at least one graphic image for identifying the defect of the OCR character region caused by irregularities in the postage indicium producing device.

6. The method of claim 1, wherein the postage indicium producing device is an inkjet printer having at least one row of inkjet nozzles to apply ink droplets onto the mailpiece, wherein the irregularities in the indicium producing device are related to missing ink droplets applied by the inkjet nozzles.

7. The method of claim 1, wherein the postage indicium producing device is an inkjet printer having a plurality of inkjet nozzles to apply ink droplets onto the mailpiece, wherein the irregularities in the indicium producing device are related to blockage of one or more inkjet nozzles.

8. A system for improving capture of a symbology region in a postage indicium applied on a mailpiece, wherein the symbology region includes symbols which may be caused to exhibit a defect associated with the production and/or scanning of the postage indicium, said system comprising:
   (a) a first mechanism, responsive to the mailpiece, for generating and providing one or more error compensation marks in the proximity of the symbology region, wherein the error compensate marks can be caused to exhibit changes indicative of the defect in the symbology region;
   (b) a second mechanism for reading the error compensation marks and producing data indicative of the error compensation marks;

(c) a third mechanism, responsive to the data, for detecting the changes in the error compensation marks and for providing a signal indicative of the changes; and (d) a fourth mechanism, responsive to the signal, for compensating for the defect in the symbology, according to the detected changes in the error compensation marks.

9. The system of claim 8, wherein the symbology region includes an OCR character region and the symbols include OCR characters.

10. The system of claim 9, wherein the second mechanism includes an optical scanner and the data includes a scanned image.

11. The system of claim 10, wherein the third mechanism includes an image processing algorithm to compare the scanned image with a fixed set of graphical information in order to detect changes in the error compensation marks.

12. The system of claim 10, further comprising an OCR reader, operatively connected to the optical scanner, for recognizing the OCR characters.

13. The system of claim 12, wherein the OCR reader is operatively connected to the third mechanism to compensate for the defect in the OCR characters, according to the detected changes in the error compensation marks.

* * * * *